July 18, 1933.  F. PFAU  1,918,556

INDICATING DEVICE FOR MEASURING INSTRUMENTS

Filed May 1, 1931

Inventor:

Friedrich Pfau

Patented July 18, 1933

UNITED STATES PATENT OFFICE

FRIEDRICH PFAU, OF JENA, GERMANY, ASSIGNOR TO THE FIRM OF CARL ZEISS, OF JENA, GERMANY

INDICATING DEVICE FOR MEASURING INSTRUMENTS

Application filed May 1, 1931, Serial No. 534,313, and in Germany May 8, 1930.

With measuring instruments furnished with scale and index it is the general practice to have the limits of tolerance indicated by two marks adjustable along the scale. Material marks covering as they do a certain part of the scale will frequently not permit of seeing with the required exactness the index positions at the limits. The present invention overcomes this drawback by using as limit marks the edges of at least one light filter which is displaceable parallel to the plane of the scale and offers the advantage of the visibility of the covered part of the scale being impaired only to a slight extent. When using a single light filter, and when the scale is given, the space between the limits is invariable and independent of the position of this space relative to the scale. A filter consisting of two parts, however, makes it possible to alter not only the position of the limits relatively to the scale but also the space between the limits.

With optical measuring instruments which are used principally in transmitted light and together with an optical index and a scale provided in one image plane of the instrument it is advisable to take as limit marks the edges of two strips of glass, celluloid or other suitable material having a slightly absorbing effect for at least part of the visible spectral range of the light rays and to make these strips displaceable from the ends of the scale and in close proximity to the plane of this scale. For this purpose for instance slightly coloured glasses or glasses of a greyish tone may be used. If instead of the material scale and the material limit marks the optical image of one or two of these elements is used, the parallax can be avoided by arranging these elements in one plane and not in two planes close together.

Figure 1:
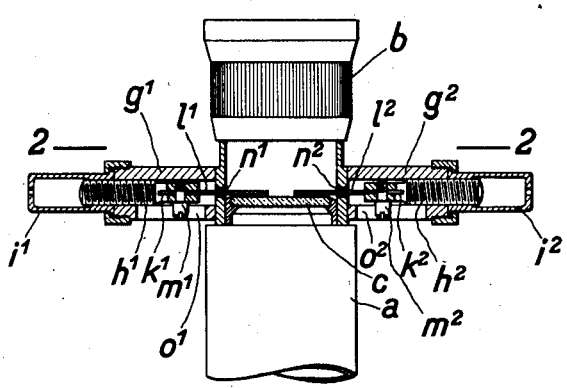

The accompanying drawing represents a constructional example of the ocular end of an optical measuring instrument, which is furnished with the indicating device according to the invention. Figure 1 illustrates the instrument in front elevation, partly in a central section, and Figure 2 represents a cross section along line 2—2 in Figure 1.

The optical measuring instrument $a$ is equipped with an adjustable ocular $b$ having in its ocular image plane a glass plate $c$ with a scale $d$. The glass plate $c$ is in the well-known manner illuminated from below in transmitted light (not shown in the drawing) and the shadow image $e$ of a line in the plane of the scale serves as an index. The tube of the ocular is enclosed in a ring $f$ fast with two tubular fittings $g^1$, $g^2$. These fittings $g^1$, $g^2$ are hollow and their axis falls in the direction of the scale $d$. In the fittings $g^1$, $g^2$ threaded bolts $h^1$ and, respectively, $h^2$ are displaceable by means of internally threaded heads $i^1$ and, respectively, $i^2$. In the ends of the bolts $h^1$, $h^2$ are provided slits $k^1$ and, respectively, $k^2$ in which screws $m^1$ and, respectively, $m^2$ are made to hold slightly coloured thin glass strips $l^1$ and, respectively, $l^2$. The glass strips $l^1$, $l^2$ extend through slits $n^1$ and, respectively, $n^2$ into the ocular tube and are close to the plane of the scale $d$ on the glass plate $c$. The heads of the screws $m^1$, $m^2$ go through slits $o^1$ and, respectively, $o^2$ provided in the fittings $g^1$ and, respectively, $g^2$ and prevent the screws $h^1$, $h^2$ from being turned.

Figure 2:
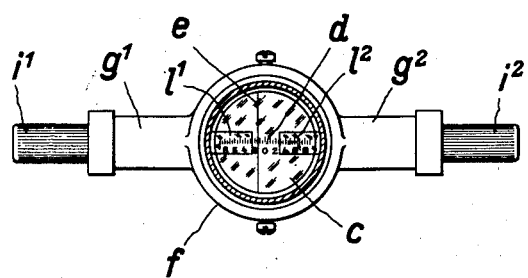

An observer looking through the ocular $b$ of the measuring instrument $a$ is confronted with the view of the image illustrated by Figure 2. By means of knobs $i^1$, $i^2$ the glass strips $l^1$, $l^2$ are adjusted with respect to their positions relative to the scale $d$ so as to suit the desired limits of tolerance. The limits of tolerance for the play of the index $e$ are indicated by the edges of the glass strips $l^1$, $l^2$, which are parallel to the devision lines of the scale $d$. The glass strips $l^1$, $l^2$ permit of seeing also that part of the scale $d$ which lies outside the limits of tolerance as well as the eventual position of the index on the said part of the scale.

I claim:

1. In an indicating device for measuring instruments, a scale and an index coacting with the scale, a light filter, this light filter covering at least one of the ends of the scale, and means for adjusting the light filter in the direction of the scale.

2. In an indicating device according to claim 1, used in optical measuring instruments, the light filter comprising two parts and means for adjusting each of the parts of the filter from either end of the scale.

FRIEDRICH PFAU.